United States Patent [19]

Belart

[11] Patent Number: 4,657,315

[45] Date of Patent: Apr. 14, 1987

[54] HYDRAULIC MOTOR VEHICLE SERVO BRAKE

[75] Inventor: Juan Belart, Walldorf, Fed. Rep. of Germany

[73] Assignee: Alfred Teves GmbH, Frankfurt am Main, Fed. Rep. of Germany

[21] Appl. No.: 744,799

[22] Filed: Jun. 13, 1985

[30] Foreign Application Priority Data

Jun. 14, 1984 [DE] Fed. Rep. of Germany ....... 3422156

[51] Int. Cl.$^4$ .............................................. B60T 8/02
[52] U.S. Cl. ..................................... 303/113; 303/116; 303/119
[58] Field of Search ............... 303/113, 114, 115, 116, 303/119; 188/181 A; 65/548, 564

[56] References Cited

U.S. PATENT DOCUMENTS

| | | | |
|---|---|---|---|
| 3,817,585 | 6/1974 | Bowler et al. | 303/115 |
| 4,123,118 | 10/1978 | Satd | 303/113 X |
| 4,555,144 | 11/1985 | Belart et al. | 303/114 X |

FOREIGN PATENT DOCUMENTS 3315731 10/1984 Fed. Rep. of Germany.

*Primary Examiner*—Duane A. Reger
*Assistant Examiner*—Matthew C. Graham
*Attorney, Agent, or Firm*—James B. Raden; William J. Michals

[57] ABSTRACT

A hydraulic motor vehicle servo brake comprises a pedal-actuated master cylinder (11) with at least one master piston (24). In addition, a brake valve (17) is provided for boosting of the brake force, which brake valve upon actuation by the brake pedal (16) feeds pressure medium supplied by a hydraulic pump (18) connected to a supply reservoir (27) in a controlled way to the master piston (24). Furthermore, a pressure accumulator (45) is provided which is maintained in loaded condition by the pump (18) and is of such capacity as to ensure that it supplies sufficient pressure during the running-up phase of the pump (18) after the motor (147) is started. A control valve (46) connected to the pressure side of the pump (18) comprises a closing member 47 which normally closes a passage to a return conduit (48) leading to the supply reservoir and is pressurized by the pressure of the pump (18) against the force of a closing member spring (49). Thus the pressure of the pump can be reduced when the controlled pressure is low and the pump is in operation. Furthermore, a control valve (50) pressurized by the controlled pressure is provided. The closing member spring (49) influences the closing member (47) by way of a relief piston (53) disposed in a cylinder (52). The relief piston (53) is pressurized against the action of the closing member spring (49) by the controlled pressure. Between the relief piston (53) and the closing member (47) a week auxiliary spring (54) is disposed whose force is just sufficient to keep the closing member (47) in closing position when the relief piston (53) is in lifted position.

8 Claims, 3 Drawing Figures

HYDRAULIC MOTOR VEHICLE SERVO BRAKE

BACKGROUND OF THE INVENTION

The invention relates to a hydraulic motor vehicle servo brake comprising a pedal-actuated master cylinder with at least one master piston, wheel brake cylinders connected thereto by way of at least one brake circuit, a brake valve inserted between the pedal and the master piston, which brake valve upon actuation by the brake pedal feeds pressure medium supplied by a motor-driven hydraulic pump connected to a supply reservoir in a controlled way to the master piston and directly to a brake circuit where it applies a controlled pressure. A pressure accumulator is maintained in loaded condition by the pump and being of such capacity as to ensure that it supplies sufficient pressure during the pump's running-up phase after the motor is started. A control valve is connected to the pump's pressure side and provided with a closing member which normally closes a passage to a return conduit leading to the supply reservoir and is pressurized against the force of a closing member spring by the pressure of the pump and in the direction of the force of the closing member spring by the controlled pressure in such a way that it reduces the pressure of the pump when the controlled pressure is low and the pump is in operation. A control valve is pressurized by the controlled pressure, which valve is connected to the hydraulic conduit from the pump to the master cylinder and in the event of there being no controlled pressure connects the pump to the pressure accumulator and in the event of their being controlled pressure separates the pump from the pressure accumulator.

In a known motor vehicle brake of the described type (German patent application DE-OS No. 33 15 731) the closing member of the control valve is kept in idle position by a spring against the pressure of the pump until the pump pressure overcomes the prestress of the spring and, if necessary, the controlled pressure. Since the pump is switched on again and again between pedal actuations due to an electric switch provided at the pressure accumulator, in order to keep the pressure accumulator in loaded condition, the closing member spring must be of such strength that the closing member is kept in its idle position until the pressure accumulator is fully loaded. This means that even in case of very weak braking operations, such as occur for example when one has to wait at a traffic light, a considerable pressure, for example 50 bar, builds up behind the pump, although during such time only low pressure on the order of 5 to 7 bar is required.

The object of the present invention is to create a motor vehicle brake of the type referred to in which in case of a low pressure requirement during a braking operation only a comparatively low pressure builds up behind the pump, thus not only saving energy but also avoiding unnecessary pressure loads on the components involved.

SUMMARY OF THE INVENTION

This object is achieved by the present invention in that the closing member spring acts upon the closing member by way of a relief piston arranged in a cylinder, that the relief piston is pressurized against the action of the closing member spring by the controlled pressure, and that between the relief piston and the closing member a weak auxiliary spring is disposed whose force is just sufficient to keep the closing member in closing position when the relief piston is in lifted position. Thus, the closing member spring is made ineffective upon occurrence of low controlled pressure, for example of 1 to 2 bar, and only the weak auxiliary spring is active, which just suffices to keep the control valve in closing position. Accordingly, pump pressures of low bar valve suffice to open the control valve and thus to avoid an unnecessarily high pressure build-up at the pump output.

In advantageous embodiment of the present invention, a push rod is disposed at the relief piston which presses against the closing member. Although the control valve according to the invention in principle can also be equipped with a closing slide, it is advantageous if the closing member is a valve cone which rests on a fitting valve seat into which the pressure input is led.

In order to achieve pressure compensation when there is a controlled pressure, it is further expediently provided that the closing member is connected to an intermediate piston which is guided closely in a cylinder portion, and that the diameter of the intermediate piston and of the cylinder portion is substantially smaller than that of the relief cylinder and the relief piston, while the cross-sectional area of the valve seat and of the intermediate piston shall be essentially the same. In order to ensure a perfect return flow to the supply reservoir, a further expedient provision is that the closing member is encased at a distance by a housing, from which an outlet leading toward the supply reservoir branches off.

In order to achieve in the brake circuit directly pressurized by the controlled pressure substantially the same brake pressure as in the second brake circuit pressurized by the master cylinder, a form of embodiment advantageous independent of the abovementioned characteristics provides that into the hydraulic conduit feeding the controlled pressure to the first brake circuit a pressure reducing valve is insertedwhich adapts the controlled pressure to the pressure prevailing in the further brake circuit in accordance with the frictional losses of the master cylinder.

Here the embodiment can be such that the pressure reducing valve comprises a piston provided with an opening and loaded against the pressure exerted by a pressure adjusting spring, in which piston a closing push rod with a closing plate is disposed opposite an outlet port and closes said outlet port when abutting on it and with its other end cooperates with a valve closing the opening in the piston in such a way that the closing push rod upon closing the outlet port opens the valve when there is further movement of the piston, with the inlet port being connected to the controlled pressure, the outlet port to the supply reservoir, and the chamber between the piston and the outlet port being connected by way of a connecting port to the first brake circuit.

BRIEF DESCRIPTION OF THE DRAWING

The present invention is described hereinafter, by way of example, with reference to the accompanying drawing wherein.

DETAILED DESCRIPTION

Figure 1:
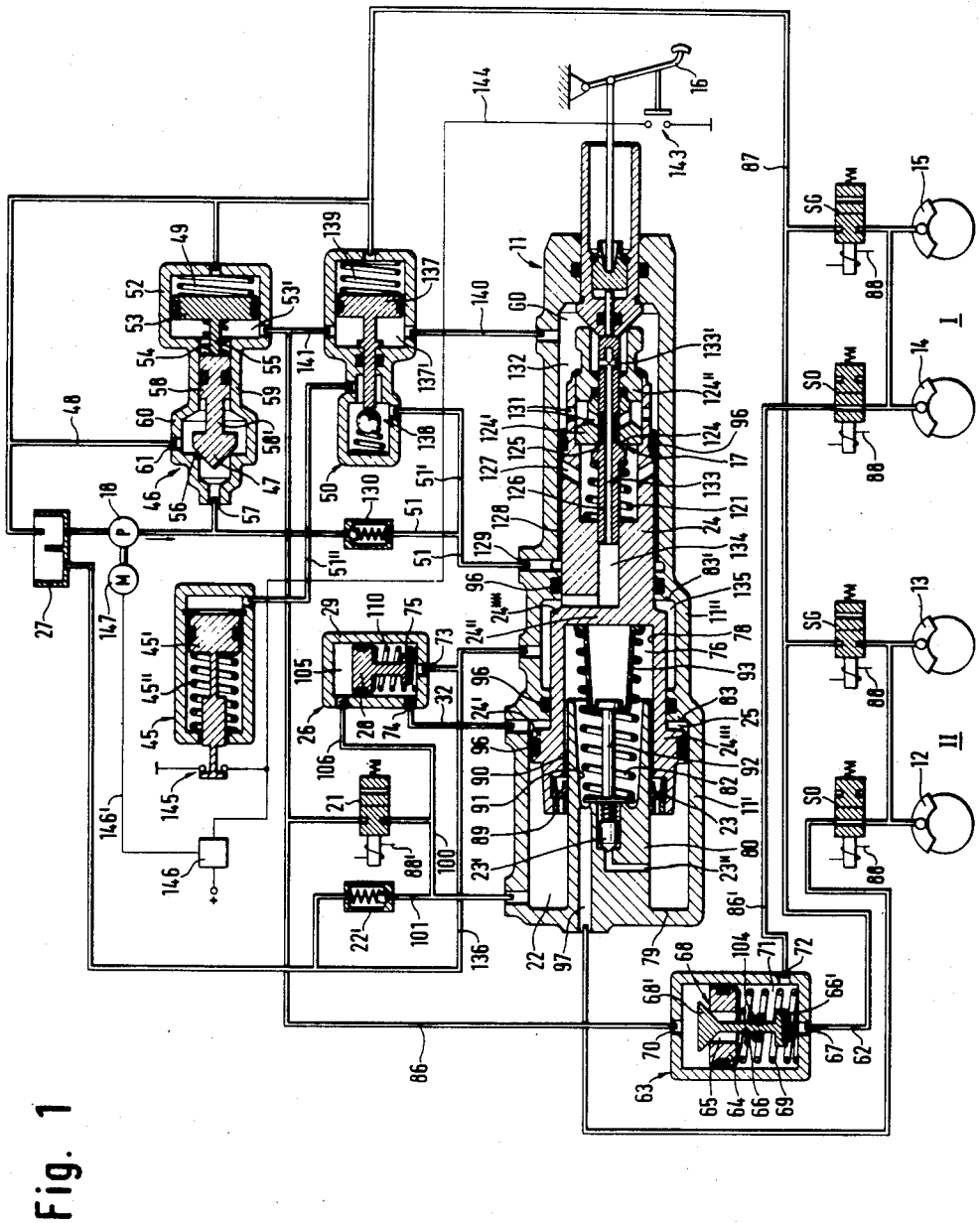
FIG. 1 is a block-diagram-like partly sectional side view of a hydraulic motor vehicle servo brake according to the present invention.

According to FIG. 1, the brake pedal 16 of a motor vehicle axially pressurizes a brake valve 17 arranged in the first master piston 24 of a tandem master cylinder 11, said brake valve 17 consisting of a valve cone 125 pre-loaded towards a valve seat 124 against the force of a spring 121. The chamber around the valve push rod 126 connected to the valve cone 124 is in communication with a hydraulic pump 18 driven by a motor 147 by way of radial bores 127 and an annular gap 128 between the master piston 24 and the master cylinder 11 as well as a port 129 and a check valve 130.

When the brake pedal 16 is pressed down, the valve cone 125 lifts off more or less from the valve seat 124 so that the pressure medium supplied by the pump 18 can pass through bores 131 in the member 124' supporting the valve seat 124 into the controlled pressure chamber 132 for pressurization of the master piston 24. The valve push rod 126 has an axial center bore 133 which communicates with the supply reservoir 27 by way of a channel 134 in the master piston 24, an annular chamber 135 and a hydraulic conduit 136. In this way the hydraulic pressure built up in the pressure chamber 132 can be reduced by way of the center bore 133 and cross bores 133' connecting it with the pressure chamber 132. When the valve push rod 126 is pushed forward, the lateral bores 133' are closed as they enter into a slide counterpart 124".

The hydraulic conduit 51 coming from the pump 18 and/or the check valve 130 comprises a branch 51' leading to a control valve 50 in which a ball valve 138 pressurized by a piston 137 is disposed and as is described in detail in DE-OS No. 33 15 731.

A helical compression spring 139 forcing the piston 137 preloads the ball valve 138 in its opening position. The pressure chamber 137' located on the side of the piston 137 facing away from the spring 139 communicates with the controlled pressure chamber 132 of the master piston 11 by way of a hydraulic conduit 140 so that the controlled pressure GD will also become effective in the pressure chamber 137' at the piston 137. The pressure in the pressure chamber 137' overcomes the preload of the helical compression spring 139 at relatively low controlled pressures in the order of no more than 1 to 2 bar.

The ball valve 138 is inserted between the branch conduit 51' and a pressure accumulator 45 connected by way of a conduit 51", the capacity of said pressure accumulator 45 being such that it can supply the pressure required until starting of the pump 18, said accumulator being otherwise as described in detail in DE-OS No. 33 15 731.

Furthermore, a control valve 46 is connected to the controlled pressure by way of the conduit 140, the pressure chamber 137' and a conduit 141. The conduit 141 leads to a pressure chamber 53' located on one side of a piston 53 arranged in a cylinder 52. On the other side of the piston 53 a closing member spring 49 is active which by way of the piston 53 and a push rod 55 acts upon an intermediate piston 58 arranged in a narrowed cylinder portion 59. Between the intermediate piston 58 and the piston 53 having a substantially larger surface a weak auxiliary spring 54 is inserted whose force is just sufficient to displace a closing member 47 secured by a rod 58' to the intermediate piston 58' to the intermediate piston 58 into its closing position on a valve seat 56.

On its side facing away from the cylinder 52, where the annular seat 56 is disposed, the control valve 46 comprises a pressure inlet port 57 connected with the output of the pump 18.

The closing member 47 is encased by a housing 60 at a radial distance all around having a lateral outlet 61 which is connected with the supply reservoir 27 by way of a hydraulic conduit 48.

At the brake pedal 16 an electric switch 143 is provided which, in the same way as a further switch 145 provided at the pressure accumulator 45, connects an electric line 144 to ground when one of the switches or both are closed. The switch 145 is closed when the accumulator 45 is discharged to such an extent that it can no longer provide sufficient pressure. The switch 143 is closed when the brake pedal 16 is pushed down.

A relay 146 provided with a make contact is excited upon closure of one of the switches 143, 145 or upon closure of both switches 143, 145 and thus switches on the pump motor 147, which is indicated by a broken connecting line 146'.

According to FIG. 1, in the master cylinder 11 comprising two annular steps 83, 83' protruding outward at an axial distance the master piston 24 expanding radially outward in corresponding steps is disposed so as to be axially slidable. Accordingly, the master piston 24 comprises step-type enlargements 24', 24'''' and the master cylinder 11 step-type enlargements 11', 11".

Gaskets 96 ensure the required sealing between the individual pressure chambers 22, 25, 135, 132 to be separated from each other.

On its side facing away from the pedal 16 the master piston 24 is provided with a cylindrical axial bore 78 so that it comprises an annular portion 24''' into which a central peg 80 firmly secured on the master cylinder bottom 79 extends from said master cylinder bottom 79. On the inner wall of the annular portion 24''' a collar is disposed as check valve 23, said collar in a sealing function sitting closely to the outer wall of the peg 80 and at its back being limited axially by a ring 89 which is adjacent to the annular chamber 22 surrounding the peg 80, with the chamber 22 in turn communicating by way of a hydraulic conduit 101 and a check valve 22' with the supply reservoir 27. Since the collar is designed at the same time as check valve 23, it opens a flow path when the pressure in the annular chamber 22 is higher than the pressure in the pressure chamber 76 of the master piston 24. In front of the check valve 23 formed by the collar, between the peg 80 and the annular portion 24''' there is an annular gap 90 to allow unimpeded passage of flow medium between the annular chamber 22 and the pressure chamber 76.

At its front end the peg 80 comprises an axial recess 91 in which a readjusting spring 82 extending to the bottom 24" of the master piston 24 is arranged. Furthermore, the recess 91 contains an axial stop pin 92 which at one end is disposed at the peg 80 and with its head provided at the other end engages behind a stop sleeve 93 secured to the bottom 24" of the master piston 24. This limits the return movement of the master piston 24 caused by the readjusting spring 82.

Instead of designing the collar 23 as check valve, a check valve 23' functioning accordingly can also be provided at the rear end of the stop pin 92 in the peg 80, said valve 23' being connected by way of a bore 23"

with the annular chamber 22 and also adjoining to the pressure chamber 76.

From the pressure chamber 76 the hydraulic conduit 97 provided in the peg 80 branches off toward a diagonal brake circuit II; the hydraulic conduit 97 leads to the closing valve SO of the two wheel brake cylinders 12, 13 of the one diagonal. The wheel brake cylinders 12, 13 are further connected by way of an opening valve SG to the hydraulic line 87 leading to the supply reservoir 27.

The closing valve SO and the opening valve SG are actuated by a wheel brake slip control system (not illustrated), which is indicated by control conduits 88 shown by broken lines. In the event of a wheel slip condition being detected by a sensor at the diagonal brake circuit II, at first the closing valve SO will close in order to limit the pressure in the wheel brake cylinders 12, 13. If this is not sufficient to avoid the slip condition, the opening valve SG will open in addition. In general, the beginning of a wheel slip condition will entail a cyclical opening and closing of the valves SO and SG, which causes consumption of a certain amount of pressure medium which will be replenished by the pump 18 in a way yet to be described.

The other diagonal brake circuit I is equally provided with a closing valve SO and an opening valve SG pressurized by the wheel brake slip control system, the opening valve SG being connected to the hydraulic conduit 87. The closing valve SO of the diagonal brake circuit II is connected by way of a hydraulic conduit 86', a pressure reducing valve 63 and a hydraulic conduit 86 to the hydraulic conduit 141 pressurized by the controlled pressure GD.

The closing and opening valves, SO and SG respectively, of the diagonal brake circuit I operate in an analogous way like the corresponding valves of the diagonal brake circuit II in the event of a beginning wheel slip condition at the wheels associated to the brake circuit I.

The pressure reducing valve 63 comprises an axially slidable piston 64 with a center opening 65 through which a closing push rod 66 extends which at its end facing away from the opening 65 bears a closing plate 66' which closes an outlet port 67 fluid-tight when abutting to it.

The outlet port 67 communicates by way of the hydraulic conduits 62, 87 with the supply reservoir 27. From the chamber 71 between the piston 64 and the outlet port 67 the hydraulic conduit 86' branches off.

At the end of the closing push rod 66 facing away from the outlet port 67 there is a valve 68 which, in FIG. 1, is formed by a valve cone 68' and the edge of the opening 65. A spring 69 preloads the piston 64 in the direction of the pressure inlet port 70 connected with the hydraulic conduit 86, while a further spring 104 presses the valve cone 68' against the opening 65 in the piston 64.

The spring 69 is so designed that the controlled pressure GD pushes the piston 64 in FIG. 1 downward, until the closing plate 66' closes the outlet port 67. Thus, the connection between the closing valve SO of the brake circuit I and the supply reservoir 27 is interrupted. Compressing the spring 104 the piston 64 then moves further downward, while the valve 68 opens and between the edge of opening 65 and the closing push rod 66 a freeflow path is created in axial direction, through which a connection is established between the hydraulic conduits 86, 86'. The slightly reduced controlled pressure is now applied to the brake circuit I.

The springs 69, 104 are so designed that the pressure in the brake circuit I is reduced to such an extent that it corresponds to the pressure in the brake circuit II, which is lower than the controlled pressure because frictional losses occur between the master piston 24 and the master cylinder 11.

In the event of a wheel brake slip condition being controlled in the brake circuit I, the amount of pressure medium consumed thereby will be replenished without any problem directly by way of the hydraulic conduit 140, the pressure chamber 137', the hydraulic conduit 86, the pressure reducing valve 63, and the hydraulic conduit 86'.

For immediate re-establishment of pressure in the brake circuit II, the relay valve 21 is provided which is connected on one side to the hydraulic conduit 86 and on the other side by way of a hydraulic conduit 100 to the annular chamber 22, which relay valve 21 in the event of a beginning slip condition switches over from its normal closing position as shown in FIG. 1 into the opening position. Energizing of the relay valve 21 by the wheel brake slip control system (not shown) is illustrated by a control line 88' indicated as a broken line. When the relay valve 21 is in its open position, the controlled pressure GD is lead from the hydraulic conduit 86 by way of the hydraulic conduit 100 into the annular chamber 22, from where the pressure medium either passes by the collar designed as check valve 23 or through the check valve 23' into the pressure chamber 76 and from there into the diagonal brake circuit II.

Since due to the pressure build-up in the pressure 76 after the switch-over of the relay valve 21 and the opening of the check valve 23 or 23' a return force is exerted on the master piston 24 which is in excess of the transverse force exerted from the pressure chamber 132, the pedal holding annular chamber 25 is provided at the annular step 83 of the master cylinder 11, which chamber 25 is in communication with a pedal holding valve 26 by way of a hydraulic conduit 32. The pedal holding valve 26 contains a valve piston 28 sliding in a cylinder 29, the pressure side 105 of the valve piston 28 being connected by way of a hydraulic conduit 106 to the hydraulic conduit 100 which, with opened relay valve 21, is pressurized by the controlled pressure GD. At its end facing away from the pressure chamber 105 the valve piston 28 comprises a closing plate 75 which is disposed opposite a connecting port 73 leading toward the supply reservoir 27. A readjusting spring 110 preloads the valve piston 28 against the pressurization so that without pressurization the valve piston 28 always adopts the position shown in FIG. 1. Upon application of the controlled pressure GD in the event of a beginning wheel slip to the pressure side 105, the valve piston 28 is displaced downwards and its closing plate 75 closes the connecting port 73, whereby the pedal holding annular chamber 25 connected by way of a hydraulic conduit 32 with the lateral port 74 of the pedal holding valve 26 is separated from the supply reservoir, which hinders the return movement of the piston 24 upon opening of the relay valve 21, i.e. it remains in its position adopted at that moment.

The mode of operation of the vehicle brake illustrated in FIG. 1 is as follows:

When, with the accumulator 45 being in loaded condition due to displacement of its piston 45' into its left-hand end position, the brake valve 17 is opened by pushing down the brake pedal 16, the pressure accumulator 45, by releasing the spring 45", first delivers by way of a control valve 50 the pressure required for generating the controlled pressure in the pressure chamber 132. At the same time, however, due to the closing of the switch 143, the motor 147 starts and builds up pressure at the pump 18. Due to the action of the spring 139, the value 138 is still in open position.

As soon as there is a controlled pressure of approximately 1 to 2 bar in the pressure chamber 132, the piston 137 of the control valve 50 is displaced towards the right and the ball valve 138 closes, so that the pressure accumulator 45 is separated from the branch conduit 51'. At the same time the piston 53 of the control valve 46 is displaced to the right, thus making the spring 49 ineffective.

Now the pressure of the pump 18 only requires a comparatively low increase relative to the controlled pressure GD prevailing in the pressure chamber 132 to open the closing member 47, whereby an unnecessary pressure build-up at the output side of the pump 18 is prevented and the pressure medium runs off to the supply reservoir 27.

When the controlled pressure is increased, however, the controlled pressure at the intermediate piston 58 and the pump pressure at the pressure inlet 57 are essentially balanced, so that the closing member 47 remains in abutment with the valve seat 56 and thus the pressure in the pressure chamber 132 can build up further.

After a braking operation the switch 143 opens and the controlled pressure GD in the pressure chamber 132 disappears, whereupon the closing member 47 is pressed against its seat 56 by considerable force exerted by the spring 49 and the pressure accumulator 45 can be loaded again with the required pressure by way of the ball valve 138 now opened again, whereupon the switch 145, having been closed in the unloaded condition, opens and the motor 147 is switched off by way of the relay 146.

Figure 2:
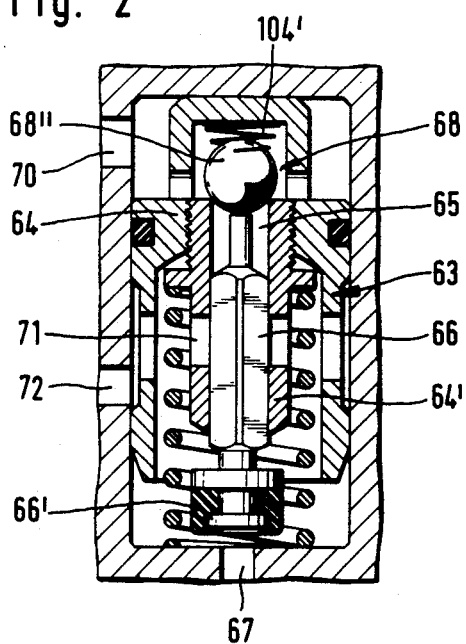
FIG. 2 is a partial sectional side view of an advantageous structural embodiment of the pressure reducing valve according to FIG. 1; and, FIG. 3 is an enlarged partly sectional side view of the pedal holding valve according to FIG. 1.

According to FIG. 2 the valve 68 in the pressure reducing valve 63 consists of a ball 68" pressed by a spring 104' against the edge of the opening 65. The closing push rod 66 is axially slidable within an extension 64' of the piston 64 and with its closing plate 66' presses against the outlet port 67 when the piston 64 is pushed downward. As soon as the closing plate 66' is seated on the outlet port 67, the closing push rod 66, in case of further downward movement of the piston 64, will move upward relative to the piston 64 and thus open the valve 68.

Figure 3:
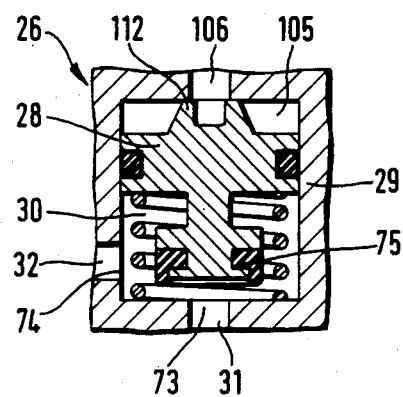

FIG. 3 shows the pedal holding valve 26 in enlarged scale. In the area where the hydraulic conduit 106 is led in, the valve piston 28 comprises an annular collar 112 which surrounds the inlet port and seals it and ensures that the valve piston 28 starts moving downward with a jerk only when there is an increased controlled pressure.

Whereas the connecting port 74 is disposed in the side of the cylinder 29, the connecting port 73 leading toward the supply reservoir 27 is disposed in the center of the bottom of cylinder 29. The blocking of the connection between the ports 73, 74 is effected by a closing plate 75 disposed, axially offset, at the lower end of the valve piston 28, which closing plate 75 is seated on the connecting port 73 when the valve piston 28 is displaced and thus tightly closes said port.

What is claimed is:
1. A hydraulic motor vehicle servo brake comprising:
a pedal-actuated master cylinder with at least one master piston, wheel brake cylinders connected thereto by way of at least one brake circuit, a brake valve inserted between the pedal and the master piston, which brake valve upon actuation by the brake pedal feeds pressure medium supplied by a motor-driven hydraulic pump connected to a supply reservoir in a controlled way to the master piston and directly to a brake circuit where it applies a controlled pressure, comprising a pressure accumulator maintained in loading condition by the pump and being of a capacity to ensure that it supplies sufficient pressure during the running-up phase of the pump after the motor is started, comprising a first control valve connected to the pressure side of the pump and provided with a closing member which normally closes a passage to a return conduit leading to the supply reservoir and is pressurized against the force of a closing member spring by the pressure of the pump and in the direction of the force of the closing member spring by the controlled pressure so that it reduces the pressure of the pump when the controlled pressure is low and the pump is in operation, and comprising a second control valve pressurized by the controlled pressure, which second control valve is connected to the hydraulic conduit from the pump to the master cylinder and in the event of there being no controlled pressure connects the pump to the pressure accumulator and in the event of there being controlled pressure separates the pump from the pressure accumulator, wherein the closing member spring (49) of the first control valve cooperates with the closing member (47) by way of a relief piston (53) disposed in a cylinder (52), wherein the relief piston (53) is pressurized against the action of the closing member spring (49) by the controlled pressure (GD), and a weak auxiliary spring (54) is disposed between the relief piston (53) and the closing member (47) whose force is just sufficient to keep the closing member (47) in closing position when the relief piston (53) is pressurized by the control pressure.

2. The motor vehicle brake according to claim 1, wherein a push rod (55) is disposed at the relief piston (53) which presses against the closing member (47).

3. The motor vehicle brake according to claim 2, wherein the closing member (47) is a valve cone which rests on a fitting valve seat (56) at which the pressure inlet port (57) is disposed.

4. The motor vehicle brake according to claim 3, wherein the closing member (47) is connected with an intermediate piston (58) which is closely guided in a cylinder portion (59) and that the diameter of the intermediate piston (58) and of the cylinder portion (59) is substantially smaller than that of the relief cylinder (52) and of the relief piston (53).

5. The motor vehicle brake according to claim 4, wherein the cross-sectional area of the valve seat (56) and of the intermediate piston (58) are essentially equal.

6. The motor vehicle brake according to claim 5, wherein the closing member (47) is encased at a distance in a housing (60) from which an outlet (61) leading toward the supply reservoir (27) branches off.

7. The motor vehicle brake according to claim 1, in which a first brake circuit is pressurized directly by the controlled pressure and at least one further brake circuit is pressurized by the master cylinder, wherein a pressure reducing valve (63) is inserted in the hydraulic conduit (62) feeding the controlled pressure to the first brake circuit (I), which valve adapts the controlled pressure to the pressure prevailing in the further brake circuit (II) in accordance with the frictional losses in the master cylinder.

8. The motor vehicle brake according to claim 7, wherein the pressure reducing valve comprises a piston (64) provided with an opening (65) and loaded against the pressure exerted by a pressure adjusting spring (69), in which piston a closing push rod (66) with a closing plate (66') is disposed opposite an outlet port (67) and closes said outlet port when abutting to it and with its other end cooperates with a valve (68) closing the opening (65) in the piston (64) so that the closing push rod (66) upon closing the outlet port (67) opens the valve (68) when there is further movement of the piston (64), with the inlet port (70) being connected to the controlled pressure, the outlet port (67) to the supply reservoir (27), and the chamber (71) between the piston (64) and the outlet port (67) being connected by way of a connecting port (72) to the first brake circuit (I).

* * * * *